United States Patent [19]

Rogstadius et al.

[11] Patent Number: 4,666,243

[45] Date of Patent: May 19, 1987

[54] FIBRE JOINT WITH OPTICAL ATTENUATION

[75] Inventors: John F. I. Rogstadius, Älvsjö; Bengt O. Lindström, Älta; Svens A. R. Persson, Hägersten, all of Sweden

[73] Assignee: Telefonaktiebolaget LM Ericsson, Stockholm, Sweden

[21] Appl. No.: 834,916

[22] Filed: Feb. 28, 1986

[30] Foreign Application Priority Data

Mar. 28, 1985 [SE] Sweden ................................ 8501551

[51] Int. Cl.⁴ .............................................. G02B 6/38
[52] U.S. Cl. ................................................ 350/96.21
[58] Field of Search ................ 350/96.20, 96.21, 96.22

[56] References Cited

U.S. PATENT DOCUMENTS

| | | | |
|---|---|---|---|
| 3,936,143 | 2/1976 | Sato | 350/96.21 |
| 4,047,796 | 9/1977 | Kao et al. | 350/96.21 |
| 4,158,476 | 6/1979 | McCartney | 350/96.21 |

Primary Examiner—John Lee
Attorney, Agent, or Firm—Roberts, Spiecens & Cohen

[57] ABSTRACT

A joint for optical fibres includes a guide sleeve (1) for concentric guidance of the fibre ends, and two ends sleeves (4,5) which are fastened around the guide sleeve and are provided with threads for threadable engagement with end fittings on the respective fibre end. One of the end sleeves (4) is united with an exterior sleeve (8) in which the other end sleeve (5) can be screwed. A locking sleeve (10) has the same external thread as the other end sleeve (5) and may be screwed into the external sleeve (8) so that it engages against the end sleeve (5) to function as a lock nut for the latter.

2 Claims, 2 Drawing Figures

FIBRE JOINT WITH OPTICAL ATTENUATION

FIELD OF THE INVENTION

The invention relates to a joint for optical fibres including a guide sleeve for concentric guidance of the fibre ends and two end sleeves, which are fixed around the guide sleeve and are provided with screw threads for threaded connection with end fittings on the respective fibre end.

BACKGROUND

Different methods are known for varying the attenuation in a conductor comprising optical fibres. For example, it is usual to displace two fibre ends mutually and transversely, which results in relatively expensive mechanical components, however.

SUMMARY OF THE INVENTION

The basic concept of the invention is to provide a fibre joint which enables a concentric displacement of the fibre ends in relation to each other for providing an adjustable gap between the end surfaces as well as fixation of the fibre ends in this position.

The invention is characterized by the provision of a sleeve extension on one of the end sleeves in which the other end sleeve is threadably engaged and a locking sleeve having the same external thread as the other end sleeve which is threadably engaged with the sleeve extension to abut against the other end sleeve to function as a lock nut for the latter.

BRIEF DESCRIPTION OF THE FIGURES OF THE DRAWINGS

The invention will now be described in detail below with the aid of an embodiment and with reference to the accompanying drawings, in which.

DETAILED DESCRIPTION OF A BEST MODE FOR CARRYING OUT THE INVENTION

Figure 1:
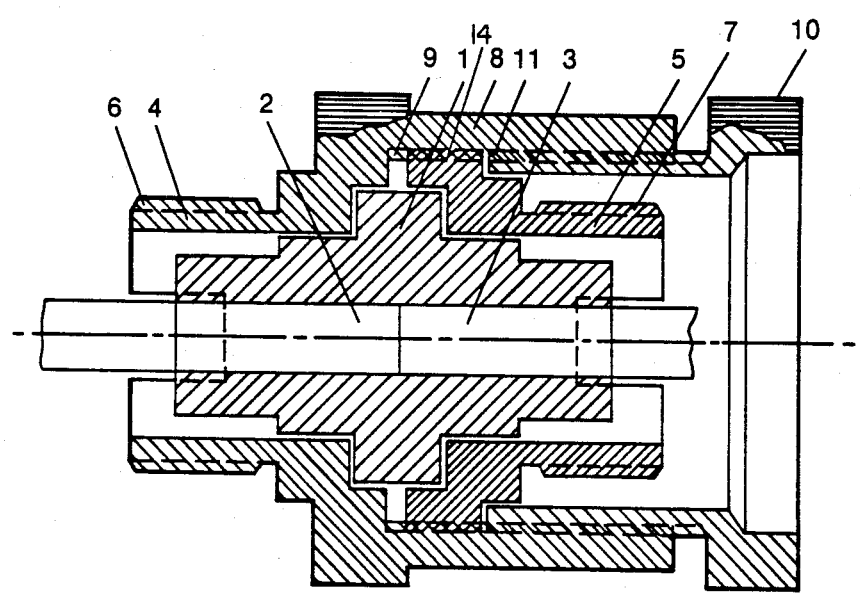
FIG. 1 illustrates, in section, a fibre joint in accordance with the invention in a position where the fibre ends against each other.
Figure 2:
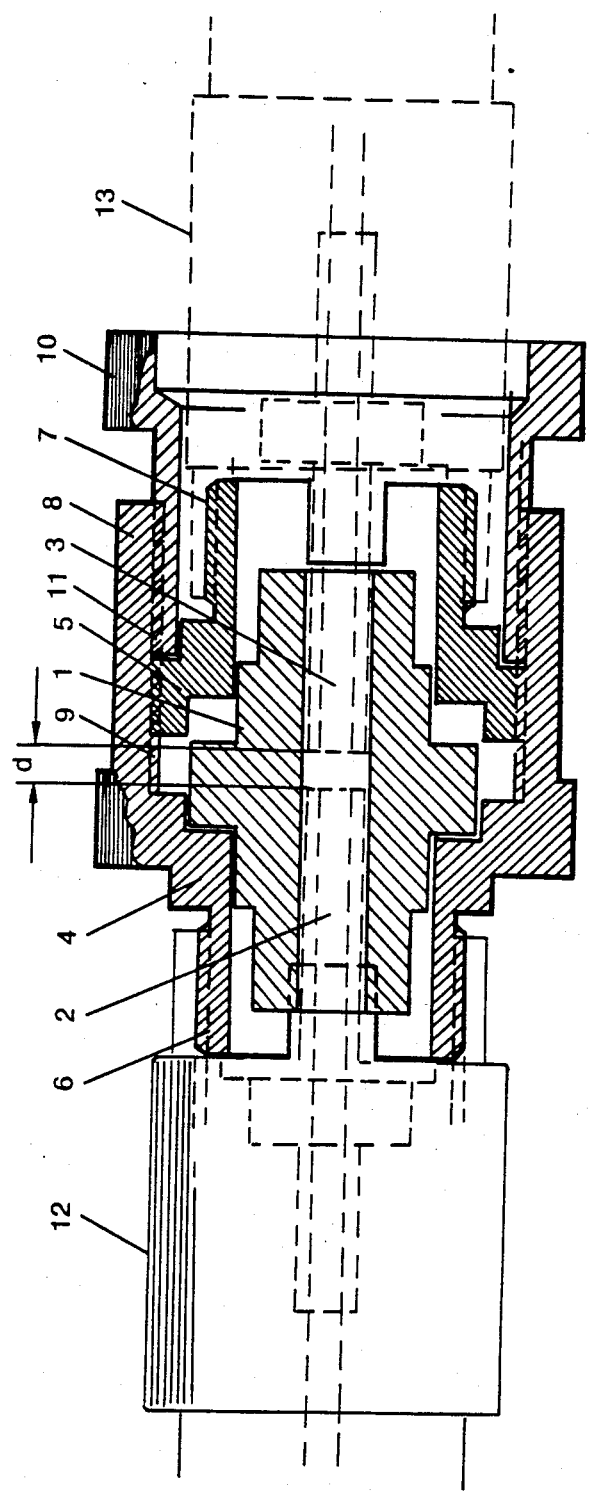
FIG. 2 illustrates the fibre joint in a position where the fibre ends are at a given distance from each other.

FIG. 1 illustrates a joint in accordance with the invention in longitudinal section. The numeral 1 denotes a guide sleeve in which fibre carrying means 2 and 3 are thrust and which keep the fibres mutually concentric. In the position illustrated in FIG. 1, the fibre ends engage each other, and in this position the optical attenuation is the lowest possible. End sleeves 4,5 are arranged for fastening the fibre ends in the joint, these sleeves being provided with external threads 6,7 for screwing into conventional end fittings 12,13 (FIG. 2), in which the fibre carrying means 2,3 are resiliently fastened. The end sleeves 4,5 surround the guide sleeve 1 such that in a screwed-together state they form a compact unit with it. One of the end sleeves 4 engages along a cylindrical surface against the guide sleeve and is prevented from undergoing axial displacement by an abutment. On its side facing towards the other end sleeve 5 the end sleeve 4 is joined to an outer sleeve 8 or sleeve extension, which has an internal diameter large enough to accommodate the end sleeve 5 and is provided with an internal thread 9, in which the end sleeve 5 can be screwed with the aid of a corresponding external thread 14. The end sleeve 5 may thus be axially displaced towards and away from the end sleeve 4 with the aid of the threads 9 and 14. The fibre ends may thus be displaced in relation to each other and the light attenuation changed to a corresponding degree. A locking sleeve 10, provided with the same external thread as the end sleeve 5, is arranged to keep the end sleeve 5 in its set position, and the locking sleeve 10 can be screwed in until its end 11 engages against the end sleeve 5, thus enabling it to function as a lock nut. The function of the parts is clearly apparent from FIG. 2, where the distance between the fibre ends has been changed in relation to that shown in FIG. 1. The fibre fittings 12,13 are screwed onto the end sleeves 4,5. The distance between the fibre ends is set to d and the end sleeve 5 is correspondingly displaced to the right. To keep end sleeve 5 in this position the locking sleeve 10 is tightened so that it engages with the end surface 11 against the end sleeve 5 and functions as a lock nut. For altering the desired gap between the fibre ends, the locking sleeve 10 is loosened, the end sleeve 5 displaced by screwing to the desired position and the locking sleeve tightened once again.

What is claimed is:

1. In a joint for the adjustable setting of a gap between opposed ends of two optical fibres, each mounted in an end fitting with threads thereon, including a guide sleeve concentrically guiding the ends of the fibres and two end sleeves surrounding the guide sleeve and provided with threads for attachment to the end fittings on the respective fibre ends, the improvement comprising a sleeve extension on one of the end sleeves surrounding the other of the end sleeves, said sleeve extension being provided with an internal thread and said other end sleeve being provided with an external thread threadably engaged with said internal thread so that the end sleeves and thereby the fibre ends can be axially displaced towards and away from each other, and a locking sleeve having an external thread which is the same as that on said other end sleeve, said locking sleeve being adjacent said other end sleeve and threadably engaged with said sleeve extension so that the locking sleeve can be threadably advanced into said sleeve extension into engagement with said other end sleeve to maintain the latter locked in a set position.

2. The improvement as claimed in claim 1 wherein said end sleeves are slidable and rotatable on said guide sleeve.